United States Patent
Flores Garrido et al.

(10) Patent No.: US 11,824,492 B2
(45) Date of Patent: Nov. 21, 2023

(54) MODULAR SYSTEM FOR CLEANING SOLAR PANELS

(71) Applicant: INTI-TECH SPA, Santiago (CL)

(72) Inventors: Camilo Emmanuel Flores Garrido, Santiago (CL); Mauricio Andres Chiong Castillo, Santiago (CL); Camilo Antonio Contreras Herrera, Santiago (CL); Diego Luis Munoz Estrada, Santiago (CL); Romina Nicole Pacheco Alarcon, Santiago (CL)

(73) Assignee: INTI-TECH SPA, Santiago (CL)

( * ) Notice: Subject to any disclaimer, the term of this patent is extended or adjusted under 35 U.S.C. 154(b) by 0 days.

(21) Appl. No.: 16/968,057

(22) PCT Filed: Feb. 1, 2019

(86) PCT No.: PCT/CL2019/050009
§ 371 (c)(1),
(2) Date: Aug. 6, 2020

(87) PCT Pub. No.: WO2020/154821
PCT Pub. Date: Aug. 6, 2020

(65) Prior Publication Data
US 2021/0351739 A1    Nov. 11, 2021

(51) Int. Cl.
*H02S 40/10*    (2014.01)
*A46B 13/00*    (2006.01)
(Continued)

(52) U.S. Cl.
CPC ............ *H02S 40/10* (2014.12); *A46B 13/001* (2013.01); *B08B 1/002* (2013.01); *B08B 1/04* (2013.01); *A46B 2200/3073* (2013.01)

(58) Field of Classification Search
CPC ....... H02S 40/10; A46B 13/001; B08B 1/002; B08B 1/04
See application file for complete search history.

(56) References Cited

U.S. PATENT DOCUMENTS

2009/0266353 A1    10/2009    Lee
2014/0150816 A1    6/2014    Potter
(Continued)

FOREIGN PATENT DOCUMENTS

EP    2696150 A1 *    2/2014    ............... B08B 1/04

OTHER PUBLICATIONS

Notification of Transmittal of the International Search Report and the Written Opinion of the International Searching Authority, or the Declaration issued in the corresponding International Application No. PCT/CL2019/050009, dated Jun. 6, 2019 (11 pages).

*Primary Examiner* — Shay Karls
(74) *Attorney, Agent, or Firm* — Adams and Reese LLP; Ray R. Ferrera (57) ABSTRACT

The invention refers to a modular system (1) for cleaning panels or an array of panels (100), comprising: at least two independent modules (10a, 10b) communicating with each other, arranged at the upper and lower ends of the array of panels (100), respectively; and at least one cleaning element (16) arranged transversely to the array of panels (100) between the at least two modules (10a, 10b) by means of couplings (17); wherein each of the modules (10a, 10b) comprises at least one traction element (14) arranged perpendicular to the array of panels (100), wherein said traction element (14) rotates when a force is applied, providing in this way movement to the modules (10a, 10b) through the array of panels (100).

21 Claims, 7 Drawing Sheets

(51) Int. Cl.
*B08B 1/00* (2006.01)
*B08B 1/04* (2006.01)

(56) References Cited

U.S. PATENT DOCUMENTS

2015/0349706 A1 12/2015 Grossman et al.
2017/0326390 A1 11/2017 Wang et al.

* cited by examiner

MODULAR SYSTEM FOR CLEANING SOLAR PANELS

The present invention relates to a system or robot for cleaning panels, in particular solar or photovoltaic panels, wherein its operation is based on independent modules that communicate with each other, arranged in an array of panels, together with a cleaning element, moving on said array of panels to clean the surface of the same. The system is manufactured in a modular manner, allowing its adaptation to different panel configurations, mainly by adjusting the distance between the modules.

The modular system for cleaning panels or arrays of panels of the invention comprises essentially at least two independent modules communicating with each other, arranged at the upper and lower ends of the array of panels, respectively; and at least one cleaning element disposed between the at least two modules transverse to the array of panels. In addition, each of the modules comprises at least one traction element thus providing movement to the modules through the array of panels.

BACKGROUND

Currently there is an increasing interest in improving the operating and efficiency conditions of photovoltaic plants, which have become an important source of renewable energy around the world. These plants are mostly located in desert areas of high radiation with very aggressive operating conditions for the involved components of the systems.

One of the risk factors of photovoltaic projects and the main cost in the operation is the soiling problem caused by the particulate material that is deposited on the surface of the panels, preventing the available radiation reaches the cells completely, thus reducing the generation of energy. The soiling, depending on the geographical situation and climatic factors, can considerably reduce the expected income and the duration of the equipment due to the accelerated deterioration of the materials.

With the exponential increase of the area covered by photovoltaic plants and as a result of being exposed to the weather, efficient solutions are necessary to carry out the cleaning of the panels and thus maintaining the performance of the plant in a high level permanently. Optimized, high-frequency cleaning methods are required to reduce soiling losses. That is, that they can cover the entire plant and to ensure the cleaning is carried out with such frequency that the accumulation of particulate material affects as least as possible the income generated by electricity generation.

In this context, and specifically in the field of systems for cleaning solar panels, there are several solutions currently available on the market, which comply with the purpose of keeping dust-free arrays of panels arranged in photovoltaic plants. However, there are a number of issues associated with its implementation so that none of these solutions is capable of addressing. One of these problems is fundamentally related to the loss of efficiency in the panels due to the large surface area of the cleaning systems, which pass over the panels producing shade on them preventing the solar radiation from reaching the cells. Another problem present in the current systems is related to the loss of efficiency due to some damage in the system or in some of its components, since in such situation the system must be completely removed for review and repair leaving the panels at the mercy of the dust, unless there is a complete supporting system which makes the process too expensive considering the size of the photovoltaic plants. The present invention is responsible for these and other issues.

In the field of patents, there are also solutions aimed at cleaning solar panels. For example, patent application US 2015/0349706 A1 describes a cleaning system for photovoltaic modules, which includes a robotic cleaning device, a support system and a curved cleaning head, wherein the support system is configured for providing a first metered amount of cleaning liquid to a reservoir included in the robotic cleaning device, wherein the first quantity of liquid is based on the level of soiling of the plurality of photovoltaic modules. In this sense, the system described by this document differs from the present invention in several aspects, the most relevant being the use of a liquid as a cleaning agent and the modular capacity of the components of each of the systems.

Regarding the first aspect, it can be seen that the document US 2015/0349706 A1 seeks to offer a cleaning solution that includes adding a cleaning liquid on the surface of the panels. Although with this system the cleaning capacity increases, the use of a liquid as a cleaning agent encounters various problems, for example, associated with the heat shock that is generated on the panels due of the sudden change of temperature when coming into contact with the liquid. In this sense, panel manufacturers recommend dry cleaning of the same, in order to avoid abrupt changes of temperature. Another problem of this type of systems is associated with the logistics and costs of constantly feeding liquid to the deposits of each robot, which is complex mainly in desert areas where photovoltaic plants are usually located, areas that have great shortages of water. Therefore, the supposed performance gained by offering a better cleaning of the panel's surface is reduced by the risks of damaging the solar panels due to the heat shock and great costs of maintaining a constant supply of cleaning liquid product. This does not occur in the system of the present invention, where the dry cleaning of the panels is envisaged, according to the requirements of each manufacturer maintaining an optimum level of cleaning in said surfaces, in order to obtain a higher performance than that obtained with solutions currently used.

Regarding the second aspect referring to the modular capacity of the components of the system, document US 2015/0349706 A1 does not describe or suggest that the cleaning robot is modular, which in case of any damage to the robot would cause the necessary removal of the entire unit. In contrast, in case of failure of any of the modules or cleaning element of the present invention, it is sufficient to remove said component without affecting the rest of the system. Indeed, the modular feature of the components forming the cleaning system of the invention allows said components to be easily interchangeable and replaceable, operations that can be performed on-site without the need to completely remove the system for repair. This feature not only facilitates the operation and maintenance of the system but also improves its availability by reducing downtime due to maintenance processes and in addition, substantially reduces the maintenance associated costs.

Another example is that disclosed in the Patent Application US 2012/0125367 A1, which describes a service device for the maintenance of an array of solar panels. Said device comprises a service unit for maintaining the surface of the array of panels, a guiding unit for guiding the service unit with respect to the array of panels, and a drive unit for moving the service unit with respect to the arrangement of panels, wherein the service unit comprises a first coupling section and a second coupling section, wherein the guiding unit can be attached to the first coupling section, the guiding unit being configured for a direct coupling with an edge of the array of panels, wherein the drive unit can be attached to the second coupling section, and wherein the second coupling section is displaceable with respect to the first coupling section by the drive unit.

In this case, the difference that exists between the present invention and the device described in document US 2012/0125367 A1 lies mainly in the non-modularity of its components, since from the description of said document there is no indication that, in case of any failure in any of the components of the system, it can be replaced in a simple manner and independent of the rest of the system as it occurs in the present invention. In addition, there are particularities that make the present invention a better solution for the problem of cleaning panels, such as for example, that each of the main components is protected by independent covers and seals, which increases their service life apart from making them easily identifiable and replaceable, reducing maintenance and repair times. Said feature is not appreciated from the description of document US 2012/0125367 A1, where it is observed that most of the components are exposed to the adverse climatic conditions to which the solar panels are subjected.

Therefore, it is necessary to have a system capable of cleaning solar panels that not only fulfills said function but also minimizes the performance losses of the array of panels in which it is operating reducing any risk of damaging the panels with the cleaning process, besides being able to have a quick and easy assembly and disassembly, that does not interfere with the structure of the panels arrangement. This and other advantages associated with other aspects of the technology are described in more detail below.

DESCRIPTION OF THE INVENTION

The invention relates to a modular system for cleaning panels or arrays of panels, in particular solar or photovoltaic panels, but which could also be used in other types of related surfaces, such as for example, the cleaning of heliostats. The system of the invention minimizes the losses in the electrical generation of the array of panels and facilitates both the assembly and the disassembly of the system, as well as its maintenance thanks to its modularity, reducing the risks of causing some type of damage to the panels and the time required to carry out maintenance operations.

According to a preferred embodiment of the invention, the modular system for cleaning panels or arrays of panels comprises:
- at least two independent and communicating modules arranged at the upper and lower ends of the array of panels, respectively; and
- at least one cleaning element arranged transversely to the array of panels between the at least two modules, wherein said at least one cleaning element is attached to said modules by means of couplings;

wherein each of the modules comprises at least one traction element disposed substantially perpendicular to the array of panels, wherein said traction element rotates by applying a force, thus providing movement to the modules through the array of panels, for the displacement of the system on the array of panels.

The independent nature of the modules that are part of the system of the invention not only refers to one module forming a unit completely independent of another, both constructively and functionally, but also refers to the ability to replace said modules in their entirety, forming completely replaceable units, either through the exchange with equivalent modules from other cleaning systems or through replacement with equivalent modules available in a stock of modules. Then, the independence of the modules forming the system of the invention is not only associated with the obvious advantages of the maintenance processes of the system, given the quick and easy operation of replacing modules, but also relates to substantially reducing the timing and transportation costs and assembly of the system. In fact, the modular configuration of the cleaning system gives it portability qualities, since in its disassembled state the modules of the system can be transported in compact form and, for example, from pairs previously paired or ready for field matching.

On the other hand, the communication between modules is essential to establish a coordinated movement of the system on the arrangement of panels to be cleaned, being relevant to emphasize that the independence between modules proposed by the invention, in terms of the difficulty that may result in the operation thereof, is resolved by constant communication between modules, which operate in coordination and as explained below in relation to a system embodiment. Additionally, the easily replaceable character of the modules is closely related to the communication between them, which is possible to establish in a simple way by configuring a communication link that is established between modules that form a cleaning system, either during the first assembly of the system or when carrying out replacement operations of one or more modules.

According to another embodiment of the invention, the system also comprises at least one profile, adjustable to the distance between the upper and lower ends of the array of panels, wherein said profile holds the modules together through at least one opening and a coupling arranged in each of the modules. Said opening and said coupling are configured for a profile to cross and be fixed to them, and thus to each module, wherein said fixing is by means of some known fixing means, which keeps the profile fixed to the module. According to a preferred alternative, the system comprises two profiles, which hold together the modules of a cleaning system through at least two openings and two couplings arranged in each of the modules. The configuration of profiles and modules with openings and couplings for connection of said profiles not only facilitates the assembly of the system, but also provides a quick and easy adjustment of the length of the system to the size of the array of panels to be cleaned.

Although one embodiment of the invention considers a structural connection between modules given only by the cleaning element that is between them, using one or more profiles arranged between modules to establish a specific structural connection between said modules is preferred in order to avoid overloading of the cleaning element, assigning to it only a cleaning function. For example, when the system operates on inclined panels, a scenario is generated in which the weight of the lower module produces tensile stress on the upper module, effort communicated to said upper module through it or the components that structurally connect both modules. Then, if one or more profiles are used between modules it is possible to reduce any traction effort on the cleaning element, assigning it only to its cleaning function by turning on its axis.

According to another embodiment of the invention, the cleaning element corresponds to a brush or a brush of cylindrical or polygonal cross section, where its bristles are hard, flexible or a combination of these characteristics. Furthermore, according to one embodiment, the brush is formed by a plurality of cleaning elements or brush sections, of which quantity and size depends on the distance between the modules, forming a modular brush easily adaptable to the size of the array of panels to be cleaned.

According to another embodiment of the invention, each of the modules further comprises at least one additional traction element, arranged substantially perpendicular to the arrangement of panels, wherein said traction element rotates when a force is applied, providing in this way an additional aid to the movement of the modules through the array of panels. Preferably, each module comprises at least two traction elements, arranged towards the ends of each module, distributing the traction force in a substantially uniform manner.

According to another embodiment of the invention, each of the modules further comprises at least one pair of guiding elements, to maintain the stability of said modules and serve as a guide at the upper and lower ends of the array of panels, particularly at the edges of said panels. In addition, the guiding elements provide support to the system, holding it by one of the ends mainly when the array of panels has an inclination. Each of the modules may further comprise at least one additional pair of guiding elements, to provide additional stability to the system and serve as a guide at the upper and lower ends of the array of panels. In this embodiment, wherein each module comprises at least two pairs of guiding elements, each pair is disposed towards the ends of the module, providing holding the system substantially uniformly. The amount of guiding elements will depend exclusively on the difficulty to move through the array of panels, which can be affected by various factors, such as, for example, the inclination, the roughness of the surface, the weight of the system, etc.

According to another embodiment of the invention, the material for manufacturing the modules, the profiles, the traction elements and the guiding elements can be selected from the group comprising alloys of steel, aluminum, wood, plastic, rubber or a combination of one or more of said materials.

According to another embodiment of the invention, each of the modules further comprises at least one actuating element, which provides rotation to the traction elements, wherein each of the modules further comprises at least one additional actuating element which provides rotation to the cleaning element through a transmission system. According to a preferred embodiment, each traction element has its actuating element, providing an independent drive of said traction elements, even allowing to continue with the displacement of the system in the event of failure of one of the actuating elements that drives the corresponding traction element. Furthermore, considering that each module comprises an additional actuating element to drive the rotation of the cleaning element, it is also possible to continue with said rotation in the event that one of said actuating elements fails.

In relation to the actuating elements, these correspond to an electric motor or any type of element capable of converting electrical energy or a fuel energy into mechanical energy. Each of the actuating elements is covered by a single sealed and waterproof housing for protection, forming an easily detachable and replaceable unit. Likewise, the transmission system corresponds to a system of pulleys and transmission belt or to any type of system capable of transmitting the energy generated by actuating elements, wherein the transmission system is covered by a sealed and impermeable individual housing for its protection, forming an easily detachable and replaceable unit.

According to another embodiment of the invention, each pair of guiding elements comprises at least two plates, wherein said plates are used to join at their ends the axes of each guide element forming a pair of guiding elements, wherein each pair of guiding elements comprises an anchoring axis connected to both plates, which as a whole allow to have a clearance to each one of said pairs of guiding elements, keeping the guiding elements always in contact with the edge of the array of solar panels, wherein said clearance achieves the effect of a damping in the system displacement, absorbing the gaps between the panels of the array.

According to another embodiment of the invention, each module also comprises at least one regulating element connected to at least one guide axis, arranged substantially perpendicular to an axis of the coupling with the cleaning element, wherein the regulating element attaches to said coupling in which one of the ends of the cleaning element is arranged, allowing to raise or lower said cleaning element in relation to the surface of the array of panels, regulating the height of said cleaning element. The regulating element, which can be activated manually or automatically, corresponds to a threaded shaft, a pneumatic or mechanical actuator, a grooved shaft at different heights or any element capable of positioning at different heights in relation to a reference point, wherein the manufacturing material of the regulating element and the guide shafts can be selected from the group comprising alloys of steel, aluminum, wood, plastic or a combination of one or more of said materials.

According to another embodiment of the invention, each module also comprises at least one controller element, which allows the synchronization of movement between modules forming the system through the synchronized control of its actuating elements and thanks to the communication existing between modules. In addition, the controller element allows establishing a communication link between one or more modules of the system with any additional module or that is available for the replacement of one or more modules. On the other hand, the controlling element allows the synchronization of the movement of the regulating elements in each module, for example in the case of automatic regulation of the brush height, as well as the coordination in the rotary drive of the cleaning element. In this sense, the communication between the controlling elements of each module is preferably done through a wireless communication protocol, for example bluetooth, wifi or any other type of wireless connection allowing the digital transmission of data. Said wireless communication between modules favors the independence of the same in constructive and functional terms, facilitating the operations of exchange or replacement of modules since the communication can be configured at any time, between any set of modules. However, if necessary, the invention also contemplates the option of establishing a cable communication link between modules, proposing a suitable connector element. Finally, each of the controller elements is covered by a sealed and impermeable individual housing for its protection, as well as the other components of each module, forming a unit that is easily detachable and replaceable.

In relation to the above, the controlling element that each module has is not only arranged for the independent and synchronized control of the actuating elements that drive the traction elements and the cleaning element, but also establishes a communication between modules connecting wirelessly with the controller element(s) of additional modules that are part of the system, allowing the synchronization of the movement of displacement and cleaning between modules, controlling the progress and cleaning of the system. Then, the controlling element is a component of the module that facilitates the establishment of a communication link between modules, either during the assembly of the system when installed on a panel or during maintenance operations where one or more modules of the system are replaced.

According to another embodiment of the invention, each module further comprises at least one energy storage element, which allows the actuating elements to operate without being permanently connected to a fixed energy source, wherein the element energy storage corresponds to a lead acid battery, lithium or any material or combination of materials capable of storing electrical energy, and wherein the energy storage element is covered by a sealed and impermeable individual housing for protection, forming a unit easily detachable and replaceable.

According to another embodiment of the invention, the system also comprises a terminal port, arranged at the beginning or end of the array of panels, in which the modules are located at the moments of non-operation.

According to another embodiment of the invention, the terminal port comprises solar panels or any other means of generating electrical energy, which deliver the recharging energy to the energy storage element. Additionally, the terminal port may comprise a sensor that detects the presence of the system, initiating the procedure of recharging the energy storage element in each module.

Finally, according to one embodiment of the invention, the modular cleaning system comprises one or more sensors designed to detect signals from the environment of the cleaning system, allowing an automatic operation thereof on the array of panels. For example, the system includes sensors that detect the limits of the array of panels, allowing the system to displace without exceeding these limits, preventing falls. In this case, during the displacement of the system towards one end of the array of panels that does not have terminal port, the sensors mounted in the system detect the end of the array of panels, stopping the system and activating the return movement towards the other end. Another example of the sensors mounted in the cleaning system is the detection of climatic variables that are used to control the activation/deactivation of the system.

In view of the above, it is relevant to note that the controller element not only allows the modules to be in contact, either through cables or wireless means, responsible for regulating the power that is delivered to each of the actuating elements for a synchronized operation thereof, but also allows said modules to act independently of one another but in communication. This is a great advantage in relation to the current solutions, since this independence between modules allows, in case of failure or maintenance of any of them, only the replacement of the module in question is necessary, installing a backup or a new one that is paired with the current module or modules that are still installed in the system, initiating the communication between modules in order to continue with the cleaning process in a synchronized form.

In addition, it is relevant to highlight the function of the plates in conjunction with the anchoring axes, which allow the guiding elements to have the necessary clearance to overcome any type of unevenness existing between adjacent panels, which prevents spending time in locating the edges of the panels in perfect alignment, which must be done in most current solutions. The same applies to the regulating element and the guide axes, arranged in each of the modules to attach the cleaning element to them, wherein said configuration allows, either manually or automatically, to raise or lower the cleaning element with respect to the surface of the panels, in case of any unevenness between adjacent surfaces, also avoiding to spend time in obtaining a perfect alignment between each of the surfaces of the panels.

Finally, it is relevant to note that each of the components of the module is an independent and replaceable unit, each component being formed and arranged in sealed housings or compartments, as in case of the actuating elements, controller elements and elements of energy storage, easily assembled in the main structure or frame of the module, allowing each component to be replaced or repaired independently, without the need to change the complete module or to detach another components thereof, that is, without intervening the rest of the components of the system.

BRIEF DESCRIPTION OF THE FIGURES

As part of the present invention, the following representative figures thereof are as follows, these figures teach preferred configurations of the invention and, therefore, should not be considered as limiting the definition of the claimed matter.

DETAILED DESCRIPTION OF A PREFERRED EMBODIMENT

Figure 1:
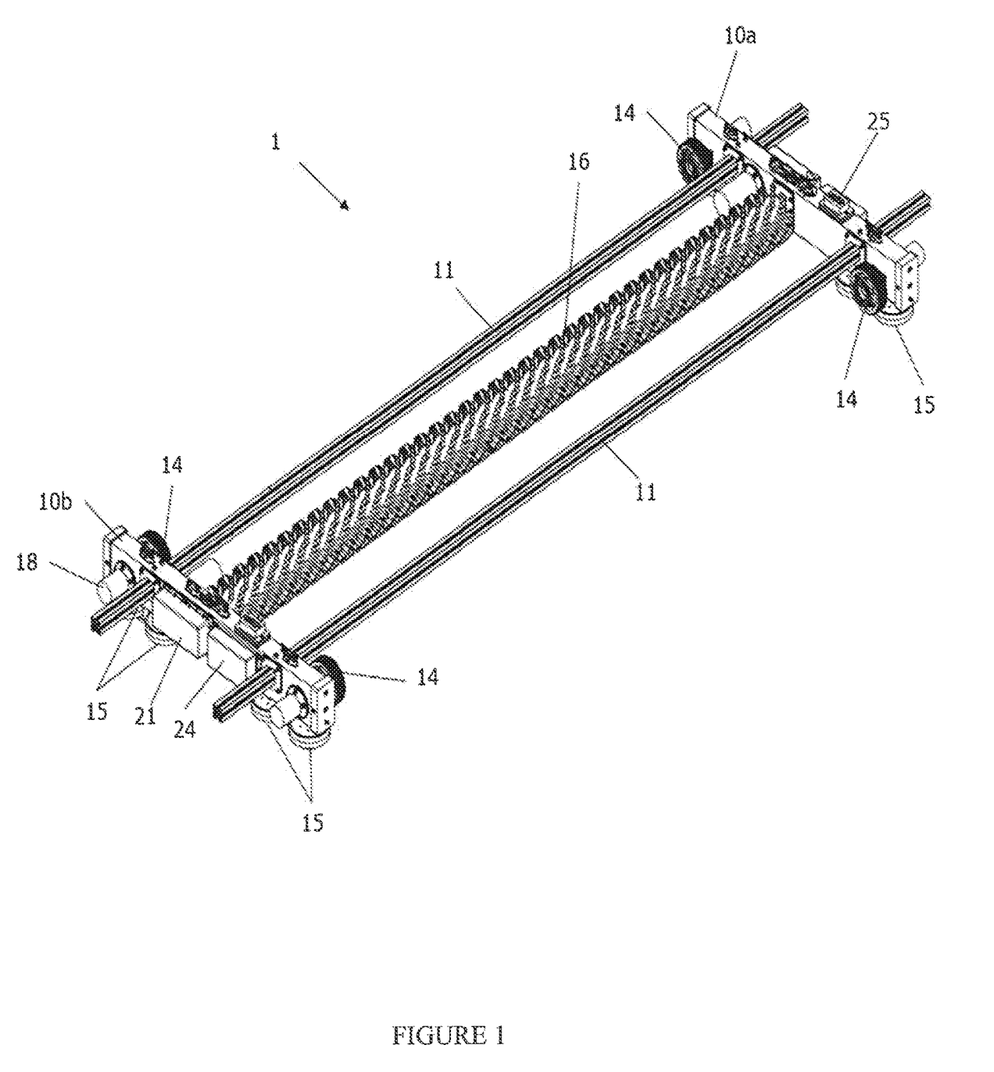
FIG. 1 shows an isometric view of the modular system for cleaning panels, according to a preferred embodiment of the invention.

With reference to the accompanying figures, in its preferred configuration, the modular system (1) for cleaning panels described by the present invention comprises, according to what is taught in FIG. 1, two independent modules (10*a*, 10*b*) communicating with each other, arranged at each end of an array of panels and using the frames of the panels as guides for their displacement along the array, thus avoiding the need to install rails or any other element of additional guide. Although in the modality of FIG. 1 two modules are illustrated, the number of modules comprising the system will depend on the specific configuration of each panel, with at least one module at each end of the system. However, in some cases with panels of greater extension, it is possible to add additional modules arranged towards the center of the system, between the modules (10*a*, 10*b*), being able to deliver greater traction and support to arrays of larger panels, for example, when three or more rows of panels are arranged together in the same arrangement. Furthermore, according to the alternative embodiment illustrated in FIG. 1, the modules are attached to each other through at least two profiles (11), which cross the surface of the array of panels from one end to the other, these profiles being (11) optional, depending on the conditions in which the array of panels is arranged, providing a structural connection between modules.

In connection with the arrangement of the independent modules, according to the example of FIG. 1, wherein the system (1) has two specular modules (10a, 10b) each arranged towards the ends of the system (1), it is relevant to emphasize that the communication between modules can be configured in a simple way during the replacement operations of one of the modules, operation in which the new pair of modules (10a, 10b) that form the system must be matched again. When removing one or both modules during a module replacement operation, a communication link must be re-established between the modules that form the system, an operation that is usually referred to as pairing. In the context of the invention said operation is simple, being only necessary to link the modules that are part of the system either through a contact or proximity communication or through an external equipment that is in communication with different modules to establish link relationships between them.

Finally, the system comprises at least one cleaning element (16), such as a brush arranged in the same orientation of the profiles (11) and attached at its ends to each of the modules (10a, 10b). According to the preferred embodiment, the cleaning element (16) rotates driven by at least one actuating element (18) such as a motor, which regulates the revolutions per minute of said cleaning element (16) and transmits its generated energy to the cleaning element (16) through a transmission system (21). Said rotational movement of the cleaning element (16) is commonly in the opposite direction to the displacement of the system on the array of panels, thus avoiding to drag the particles that are on the panel, which usually scratches its surface. It is important to emphasize that the cleaning element (16) consists of multiple cleaning elements of a standard length, which are coupled until reaching the desired measure. This allows a simpler assembly and disassembly, besides allowing, in case of any failure in any of the sections of the cleaning element (16), the replacement only of the affected part, thus avoiding having to replace the complete cleaning element (16). According to a preferred embodiment of the invention, the modules of the system are attached together only by the cleaning element (16), wherein said cleaning element provides the required structural connection between both modules.

In FIG. 1 it is also observed that each of the modules (10a, 10b) comprises two traction elements (14) and four guiding elements (15), which together allow the displacement of the system (1). On the one hand, the traction elements (14), which may be some type of wheel, for example, allow the system (1) to move across the surface of the array of panels. This movement can be delivered by means of manual actions carried out by an operator or by means of actuating elements (18), such as an electric motor, arranged by each of the traction elements (14) in the modules (10a, 10b), which receive energy from at least two energy storage elements (25), such as lithium batteries, also arranged in each of the modules (10a, 10b) respectively. On the other hand, the guiding elements (15), which can also be wheels, for example, fulfill the function of keeping the modules (10a, 10b) in a correct position in relation to the array of panels. In addition, thanks to the fact that they are arranged in pairs, they allow having a gap between them when pivoting around a common axis, which helps the modules (10a, 10b) to overcome small bumps between panels. The number of traction elements (14) and guiding elements (15) will depend on the difficulties that exist to mobilize the system, depending on the arrangement in which the array of panels (100) is located, and the system can operate only with a traction element (14) arranged in each module (10a, 10b).

To ensure that there is no type of gap in the movement of the modules (10a, 10b), a controller element (24) such as a controller card, is also provided in each of the modules, which allows the modules (10a, 10b) to be in communication with each other, taking charge in addition to regulate the power that is delivered to each of the actuating elements (18), maintaining a synchronized operation of the modules. This communication established between the modules (10a, 10b) allows said modules to act independently of one another but always maintaining coordination in the operation. In addition, in case of replacement of a module, the system is able to initiate a new communication link between modules in order to keep their operation synchronized. As noted, in this case the new communication link can be established automatically, when a module is recognized wirelessly with another in its vicinity or by an external user equipment, used to link the modules forming the system.

Figure 2:
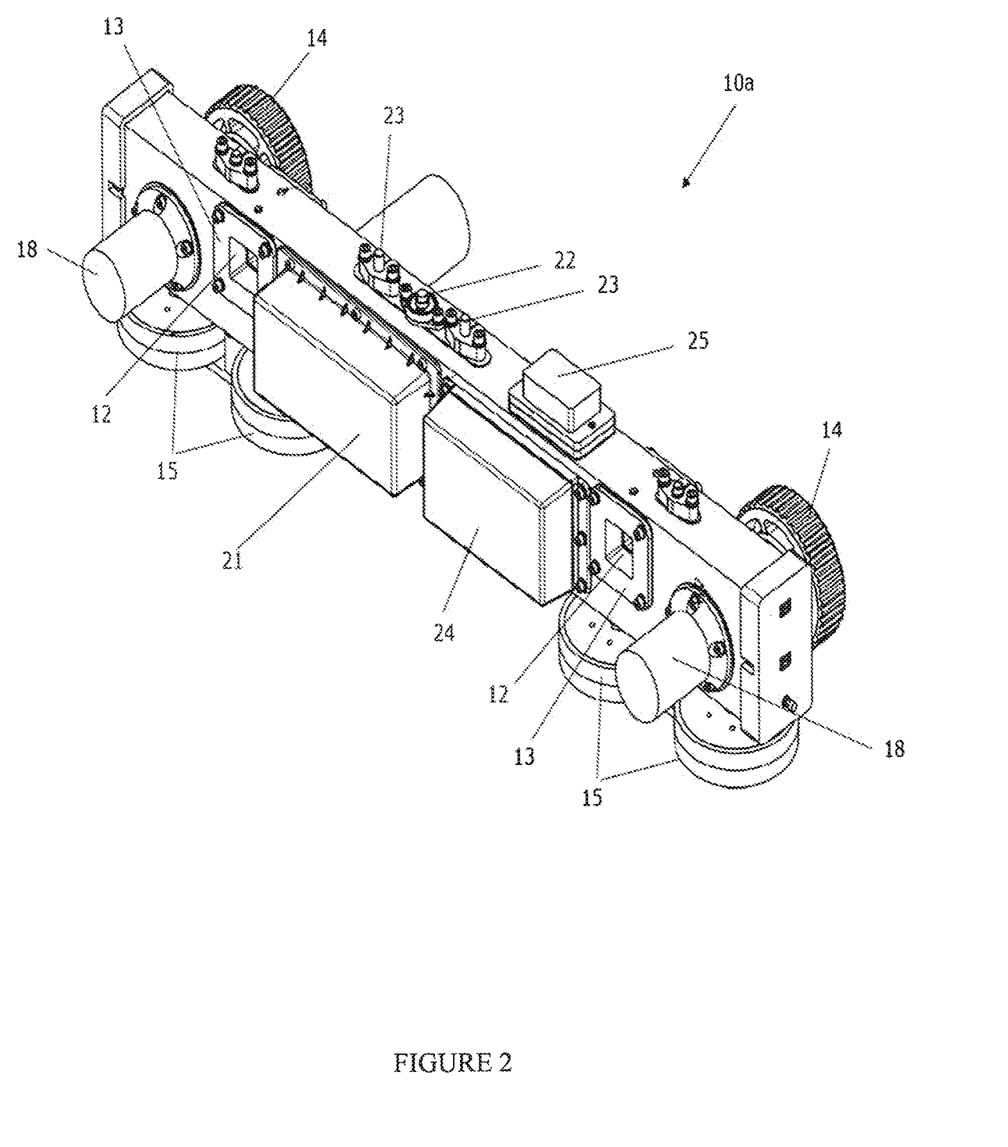
FIG. 2 shows an isometric view of an independent module, according to a preferred embodiment of the invention.

FIG. 2 shows in detail the independent module (10a) which is practically identical to the module (10b) except for its specular configuration. It is possible to observe the same elements already described for FIG. 1, also it shows the holes (12) through which each of the profiles (11) cross, as well as the anchors (13), which allow to fix the profiles (11) to each end of the modules (10a, 10b). In addition, the regulating element (22) and the guide shafts (23), responsible for raising or lowering the cleaning element (16) with respect to the surface of the panels, are observed. According to one embodiment, the profiles (11) have a cross section in the shape of a cross or another shape that facilitates the sliding of each profile with respect to each module and, at the same time, facilitates the fixing of said profiles to each module.

Another important characteristic to point out from this figure is that, on the one hand, the system (1) is modular because it has only two modules for its assembly (10a, 10b), one or more profiles (11) and an cleaning element (16) independent of each other and on the other hand, there is also a constructive modularity in each of the modules (10a, 10b). As can be seen in FIG. 2 each of the components of the module is a separate unit, each component being formed and arranged in sealed housings or compartments, as it is the case of the actuating elements, controller elements and energy storage elements, and/or easily assembled in the main structure or frame of the module as it is the case of the traction, guidance and cleaning elements, being able to be replaced or repaired independently without the need to change the complete module. In this context, each unit that forms part of the module (10a, 10b) can be protected through a cover that has a sealing means, such as an O-ring or some other type of seal, forming a waterproof coupling between the respective cover and the frame or body of each module, thus preventing the water or dust entry into the critical, mobile and/or electronic components of each module. In this sense, it is relevant to emphasize that the configuration of each module as a frame arranged to receive the components that form the same wherein said components are formed as independent units and easily assembled from their respective cover and seal, allows to avoid the use of protective housings that cover the entire system, as it is described and used in many of the solutions currently used, which reduce the efficiency of the arrays of panels due to the greater production of shaded areas on its surfaces, situation that is optimized by the present invention reducing to the minimum the environmental conditions impact on the components, for example, the entry of dust or water to some of said components of the system, the latter thanks to the fact that each component of the system is attachable to the modules as a unit, comprising independent housings for each component forming an easily detachable and replaceable unit.

Figure 3:
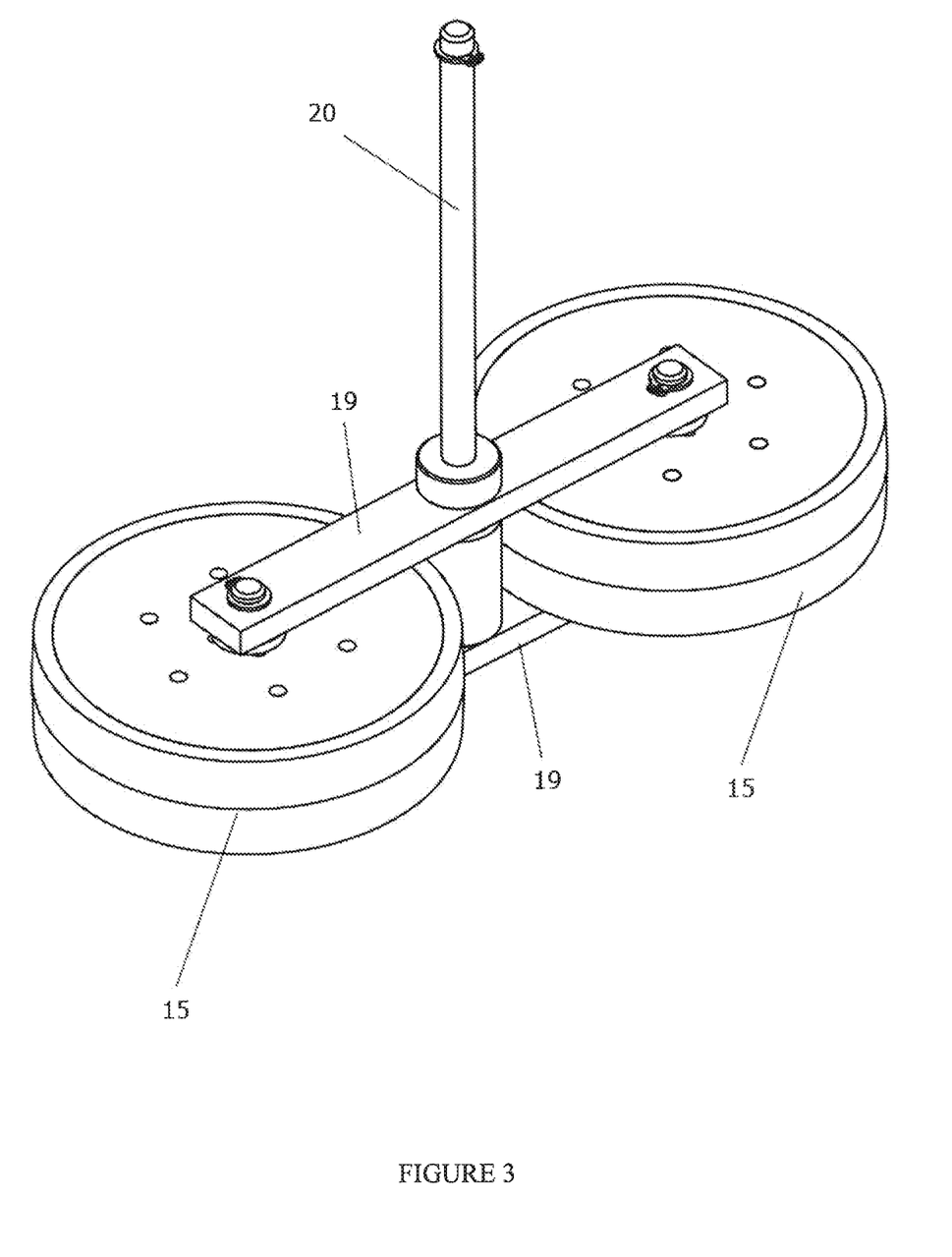
FIG. 3 shows the arrangement of the pairs of guiding elements, according to a preferred embodiment of the invention.

Referring to FIG. 3, it shows in detail the arrangement of pairs of guiding elements (15), which are attached on their axes by two plates (19) and pivoting with respect to an axis of anchor (20) that attaches to the respective module. This allows the modules to obtain a clearance between the guiding elements (15) of the respective pair, which translates into another advantage of the present invention in comparison with the existing solutions, since this arrangement allows the modules to pass over any type of unevenness that exists between adjacent panels, which would stop most of the current cleaning devices. In this context, the arrangement of each pair of guiding elements (15) acts as a suspension element absorbing the gaps between panels, favoring the circulation of each module.

Figure 4:
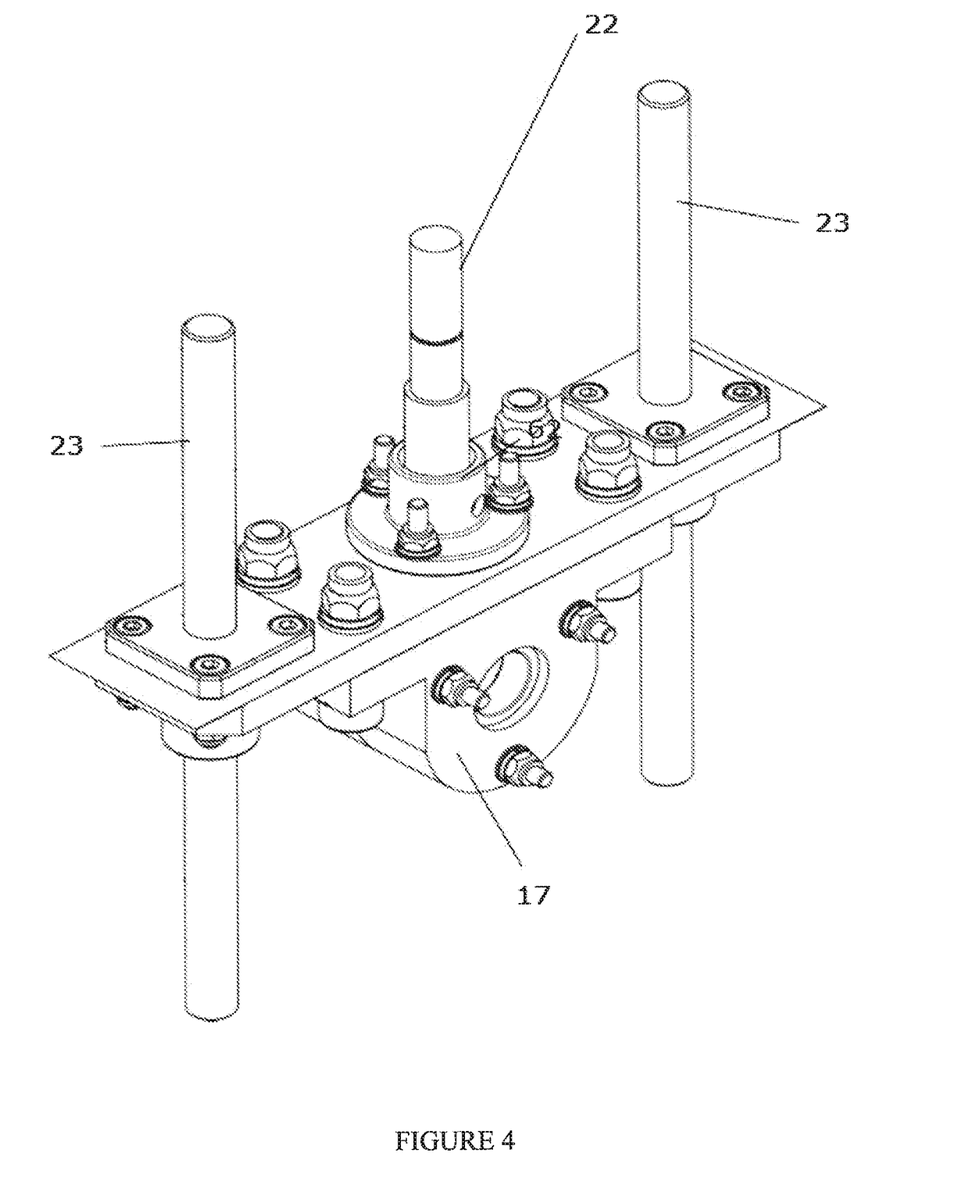
FIG. 4 shows the arrangement of the threaded shaft together with the guide axes of each of the modules, according to a preferred embodiment of the invention.
Figure 5:
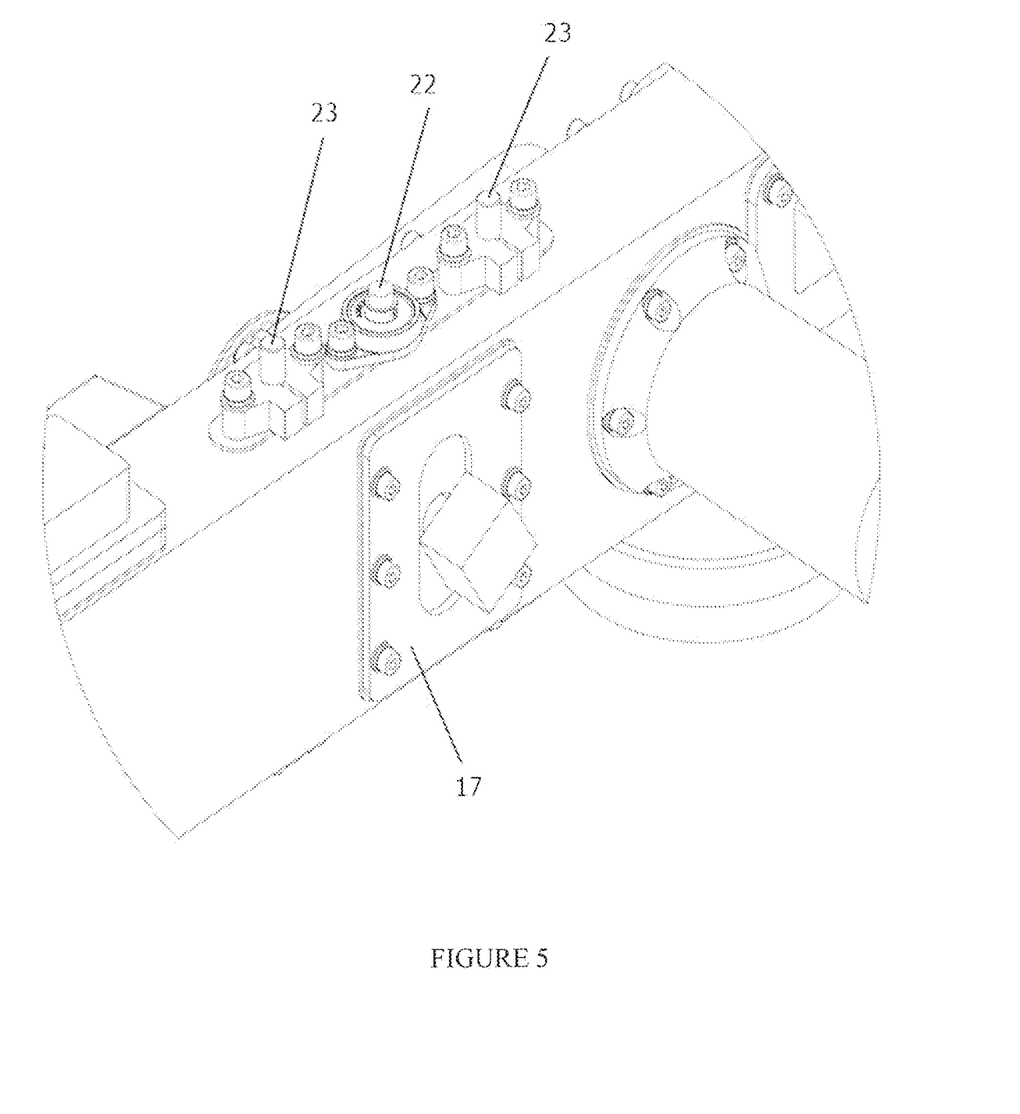
FIG. 5 shows the clearance that the height of the cleaning element has, according to a preferred embodiment of the invention.

With respect to FIGS. 4 and 5, these detail the arrangement of the regulation element (22) in conjunction with the guide axes (23) in the respective module. The ends of the cleaning element (16) are attached to the couplings (17), said couplings (17) having a clearance as to the height at which the end of the cleaning element (16) can be attached. This height is regulated by the regulating element (22), which can be operated to raise the cleaning element (16) or to lower it, depending on the conditions of the surface of the array of panels. This is a further advantage of the system (1) compared to that described in the state of the art, since the present invention is not only capable of avoiding unevenness between the upper parts of the adjacent panels, but it is also capable of moving the cleaning element (16) in case of unevenness between the surfaces of adjacent panels. The operation of the regulating element (22) can be carried out by manual operation thereof or by the same controlling element (24) which, by means of sensors, can detect when it is necessary to proceed with the movement of the cleaning element (16).

Figure 6:
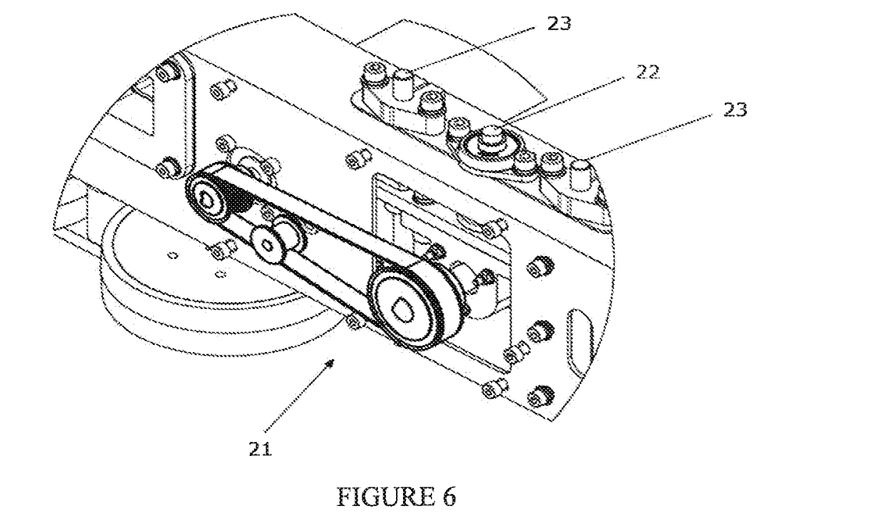
FIG. 6 shows a detail of the transmission system transmitting the rotational movement to the cleaning element.

Additionally, FIG. 6 shows a detail of the transmission system (21) arranged to transmit the rotational movement of the at least one actuating element (18) towards the cleaning element (16). Said transmission system (21) consists of a system of pulleys and a transmission belt, which allows maintaining the rotational movement of the cleaning element (16) while the height adjustment of said element is made, through the regulating element (22) in conjunction with the guide axes (23).

Figure 7:
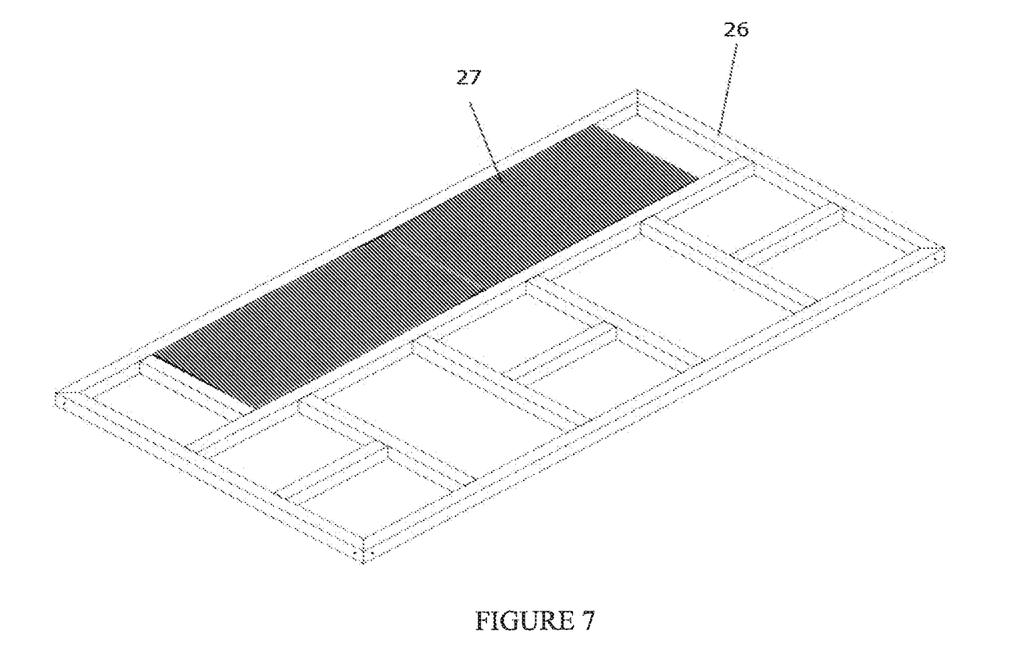
FIG. 7 shows the system terminal port, according to a preferred embodiment of the invention.

FIG. 7 shows the terminal port (26), to which the system (1) is coupled at time-out lapses or to recharge the energy storage elements (25). Said terminal port (26) can deliver energy to the energy storage elements (25), either through a fixed source or through solar panels (27) arranged therein. It is important to emphasize that by not having to load the system (1) with any means of recharging, the weight of the system is reduced requiring less energy to mobilize it, as well as the shadows produced on the surface of the array of panels are reduced, increasing with this the electrical production efficiency.

Figure 8:
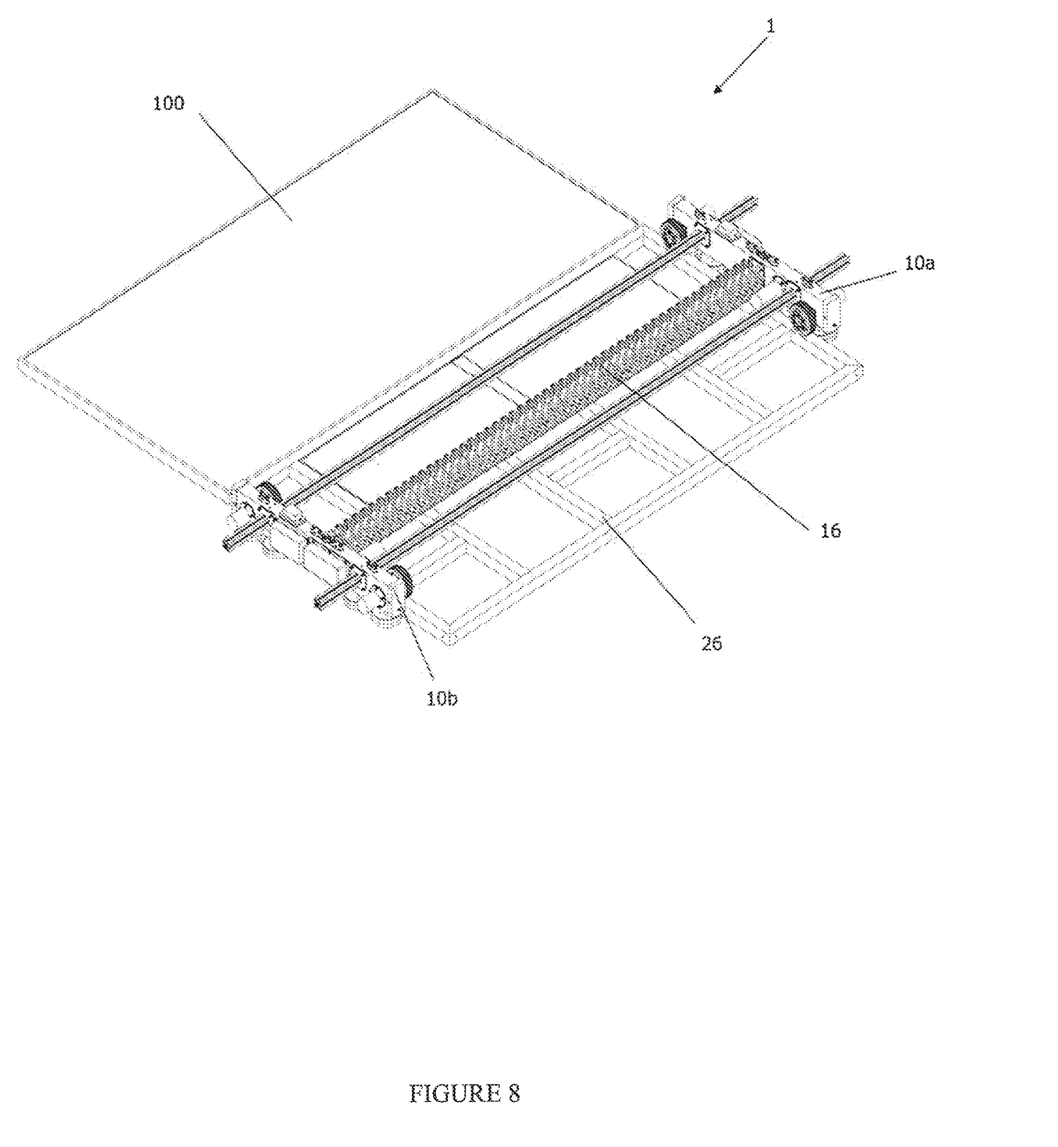
FIG. 8 shows a view of the complete system arranged in an array of panels, according to a preferred embodiment of the invention.

Finally, FIG. 8 shows the complete system (1), arranged in the terminal port (26) at the end of an array of panels (100). It is observed how the terminal port (26) is constructed in such a way as to be a continuation of the panels, not interfering with the movement of the modules (10a, 10b). Likewise, it can be seen the small amount of elements that cause shade to the array of panels (100), which undoubtedly contributes to the production efficiency in a photovoltaic plant.

NUMERICAL REFERENCES

1 Modular system for cleaning the panels
10a, 10b Independent modules
11 Profiles
12 Openings
13, 17 Couplings
14 Traction element
15 Guiding element
16 Cleaning element
18 Actuating element
19 Plate
20 Anchor shaft
21 Transmission system
22 Threaded shaft
23 Guiding shaft
24 Controller element
25 Energy storage element
26 Terminal port
27 Solar panel
100 Array of panels

The invention claimed is:

1. A modular system (1) for cleaning panels or arrays of panels (100), characterized in that it comprises:
   at least two independent modules communicating with each other, arranged at the upper and lower ends of the array of panels (100), respectively, thus forming an upper module (10a) and a lower module (10b); and
   at least one cleaning element (16) disposed transversely to the array of panels (100) between the at least two upper and lower modules (10a, 10b), wherein said at least one cleaning element is attached to said upper and lower modules (10a, 10b) by means of couplings (17);
   wherein each of the upper and lower modules (10a, 10b) comprises at least one traction element (14) arranged perpendicular to the array of panels (100), wherein said traction element (14) rotates when a force is applied, providing in this way movement to the upper and lower modules (10a, 10b) through the array of panels (100);
   wherein each of the upper and lower modules (10a, 10b) comprises at least one actuating element (18), which provides rotation to the traction elements (14);
   wherein each upper and lower module (10a, 10b) further comprises at least one controller element (24), which allows the synchronization of movement between said upper and lower modules (10a, 10b), wherein the at least one controller element (24) establishes a communication link between the upper and lower modules (10a, 10b); and
   wherein the synchronization of movement between the upper and lower modules (10a, 10b) is performed through the synchronized control of its actuating elements (18),
   wherein the at least one controller element (24) from any of the modules (10a, 10b) has the capacity of establishes a communication link between said module with any additional module or that is available for the replacement of one or more of said modules (10a, 10b).

2. The system (1) according to claim 1, characterized in that it also comprises at least one profile (11) adjustable to the distance between the upper and lower ends of the array of panels (100), which holds the upper and lower modules together (10*a*, 10*b*) through at least one opening (12) and one coupling (13) arranged in each of the upper and lower modules (10*a*, 10*b*), by which each profile (11) passes through and attaches to each module.

3. The system (1) according to claim 1, characterized in that it comprises two profiles (11), which hold the upper and lower modules together (10*a*, 10*b*) through at least two openings (12) and two couplings (13) arranged in each of the upper and lower modules (10*a*, 10*b*).

4. The system (1) according to claim 1, characterized in that the cleaning element (16) corresponds to a brush or brush of cylindrical or polygonal cross section, wherein its bristles are hard, flexible or a combination of these characteristics.

5. The system (1) according to claim 1, characterized in that each of the upper and lower modules (10*a*, 10*b*) further comprises at least one additional traction element (14), arranged perpendicularly to the arrangement of panels (100) to rotate by applying a force to them, thereby providing an additional aid to the movement of the upper and lower modules (10*a*, 10*b*) through the array of panels (100).

6. The system (1) according to claim 1, characterized in that each of the upper and lower modules (10*a*, 10*b*) further comprises at least one pair of guiding elements (15) to maintain the stability of said upper and lower modules (10*a*, 10*b*) and serve as a guide at the upper and lower ends of the array of panels (100).

7. The system (1) according to claim 6, characterized in that each of the upper and lower modules (10*a*, 10*b*) further comprises at least one additional pair of guiding elements (15), to provide additional stability to the system (1) and to serve as a guide at the upper and lower ends of the array of panels (100).

8. The system (1) according to claim 1, characterized in that each pair of guiding elements (15) comprises at least two plates (19), wherein said plates (19) are used to attach at their ends a shafts of each guiding element (15) forming the pair of guiding elements, wherein each pair of guiding elements (15) comprises an anchor shaft (20) that attaches to both plates (19), which as a whole allows to have a clearance in each of said pairs of guiding elements (15), further allowing a pivoting movement about a common axis of the guiding elements (15) that make up each of said pairs of guiding elements (15).

9. The system (1) according to claim 1, characterized in that each of the upper and lower modules (10*a*, 10*b*) further comprises at least one additional actuating element (18), which provides rotation to the cleaning element (16) through a transmission system (21).

10. The system (1) according to claim 9, characterized in that the actuating elements (18) correspond to an electric motor or any type of element capable of converting electrical energy or a fuel energy into mechanical energy.

11. The system (1) according to claim 10, characterized in that each of the actuating elements (18) is covered by a sealed and impermeable individual housing for its protection, forming an independent and individually replaceable unit in each upper and lower module (10*a*, 10*b*), without intervening the rest of the components.

12. The system (1) according to claim 9, characterized in that the transmission system (21) corresponds to a system of pulleys and drive belt or to any type of system capable of transmitting the energy generated by actuating elements.

13. The system (1) according to claim 12, characterized in that the transmission system (21) is covered by a sealed and impermeable individual housing for its protection, forming an independent and individually replaceable unit in each upper and lower module (10*a*, 10*b*), without intervening the rest of the components.

14. The system (1) according to claim 1, characterized in that each upper and lower module (10*a*, 10*b*) further comprises at least one regulating element (22) connected to at least one guiding shaft (23), arranged substantially perpendicular to an axis of the coupling (17), wherein the regulating element (22) attaches to the coupling (17) of each module, in which the ends of the cleaning element (16) are arranged, allowing to raise or to lower said cleaning element (16) in relation to the surface of the array of panels (100).

15. The system (1) according to claim 14, characterized in that each of the controller elements (24) is covered by a single sealed and impermeable housing for its protection, forming an independent and individually replaceable unit in each upper and lower module (10*a*, 10*b*), without intervening the rest of the components.

16. The system (1) according to claim 15, characterized in that the energy storage element (25) is covered by a sealed and impermeable individual housing for its protection, forming an independent and individually replaceable unit in each upper and lower module (10*a*, 10*b*), without intervening the rest of the components.

17. The system (1) according to claim 1, characterized in that the communication between the controller elements (24) of each upper and lower module (10*a*, 10*b*) is carried out through a wireless communication protocol that allows the digital transmission of data, wherein said communication between modules can be configured at any time with one or more additional modules.

18. The system (1) according to claim 17, characterized in that the energy storage element (25) corresponds to a lead acid battery, lithium or any material or combination of materials capable of storing electrical energy.

19. The system (1) according to claim 18, characterized in that the terminal port (26) comprises solar panels (27) or any other means for generating electrical energy which deliver the recharge energy to the storage element of energy (25) of each module once they are located on the terminal port (26).

20. The system (1) according to claim 1, characterized in that each upper and lower module (10*a*, 10*b*) further comprises at least one energy storage element (25) which allows the actuating elements (18) to operate without being permanently connected to a fixed energy source.

21. The system (1) according to claim 20, characterized in that it also comprises a terminal port (26) arranged at the beginning or at the end of the array of panels (100), in which the upper and lower modules (10*a*, 10*b*) are located at time-out lapses.

* * * * *